US012730688B2

(12) United States Patent
Sagar et al.

(10) Patent No.: US 12,730,688 B2
(45) Date of Patent: Sep. 8, 2026

(54) DATA TRANSFORMATIONS FOR DATA SOURCES OF A FEDERATED APPLICATION PROGRAMMING INTERFACE

(71) Applicant: Salesforce, Inc., San Francisco, CA (US)

(72) Inventors: Gaurav Sagar, Bellevue, WA (US); Antonio Garrote, San Francisco, CA (US); Javier Isoldi, Buenos Aires (AR); Patricio Barletta, Brentwood, CA (US)

(73) Assignee: Salesforce, Inc., San Francisco, CA (US)

( * ) Notice: Subject to any disclaimer, the term of this patent is extended or adjusted under 35 U.S.C. 154(b) by 699 days.

(21) Appl. No.: 17/885,175

(22) Filed: Aug. 10, 2022

(65) Prior Publication Data

US 2024/0054027 A1 Feb. 15, 2024

(51) Int. Cl.
*G06F 9/54* (2006.01)

(52) U.S. Cl.
CPC .............. *G06F 9/541* (2013.01); *G06F 9/547* (2013.01)

(58) Field of Classification Search
None
See application file for complete search history.

(56) References Cited

U.S. PATENT DOCUMENTS 6,202,099 B1 * 3/2001 Gillies .................... G06F 9/546 719/317
10,437,712 B1 * 10/2019 Tyler .................. G06F 11/3684
11,665,241 B1 * 5/2023 Wade .................... H04L 67/141 709/227
2018/0232404 A1 * 8/2018 Bhatti ................. G06F 16/9024
2020/0311063 A1 * 10/2020 Hariharasubrahmanian ................ G06F 16/24573
2022/0269552 A1 * 8/2022 Bendelac .............. G06F 16/252
2022/0414068 A1 * 12/2022 Tikhonova ............ G06F 16/212
2024/0045742 A1 * 2/2024 Sagar ...................... G06F 9/543

* cited by examiner

*Primary Examiner* — Umut Onat
(74) *Attorney, Agent, or Firm* — Holland & Hart, LLP.

(57) ABSTRACT

Methods, systems, and devices for data processing are described. A federation management service may receive a user input indicating multiple data sources as federation inputs into federated application programming interface (API). The one or more data sources may have a first metadata input that defines a target schema for a computed field and a second metadata input that defines a transformation for computing a value for the computed field from a data source schema to the target schema for the computed field. A runtime service of the federation management service may compute the value of the computed field using the second metadata input. The federation management service may generate the federated API from the data sources, where the federated API includes the computed field.

20 Claims, 12 Drawing Sheets

DATA TRANSFORMATIONS FOR DATA SOURCES OF A FEDERATED APPLICATION PROGRAMMING INTERFACE

FIELD OF TECHNOLOGY

The present disclosure relates generally to data processing, and more specifically to data transformations for data sources of a federated application programing interface (API).

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant data processing system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may interface with one or more databases, application programming interfaces (APIs), or web services. A federated API may aggregate one or more data sources and may federate fields as they exist in the data sources.

DETAILED DESCRIPTION

Figure 1:
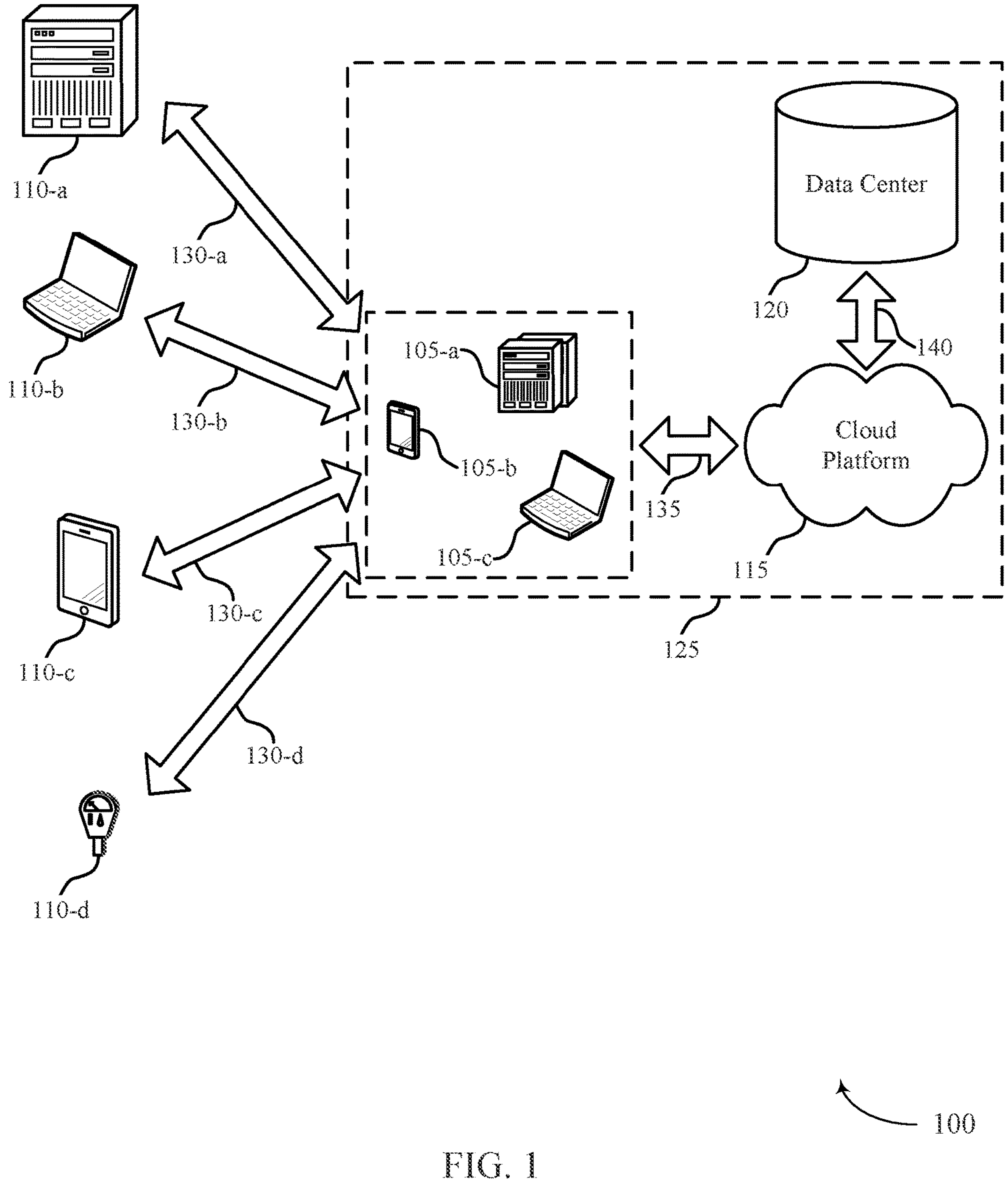
FIG. 1 illustrates an example of a data processing system that supports data transformations for data sources of a federated application programing interface (API) in accordance with aspects of the present disclosure.

Some software applications may retrieve data from multiple data sources. For example, an application that provides the status of an online purchase may retrieve data from a first data source that includes shipping information related to the online purchase, a second data source that includes order status information related to the online purchase, and a third data source that includes details related to the item being purchased. The application may interface with these data sources via one or more application programming interfaces (APIs). In some examples, one or more of the data sources may be examples of source APIs, databases, or other types of data sources. Conventional techniques for retrieving data from source APIs (or other data sources) involve querying individual sources and merging or linking fields via hard-coded relationships.

A federation management service may support a federated (aggregated, unified) API that can provide access to multiple constituent data sources. For example, a user (e.g., an API architect or developer) of the federation management service may declaratively link objects or fields from different data sources via a user interface. The federation management service may generate the federated API with a data schema that is compatible with the underlying data sources. As described herein, a federated API may also be referred to as a DataGraph. In some cases, the federated API may not support data sources with different formats or functionalities. Conventional techniques for aggregating such data sources may involve manually rewriting or adjusting source code, which can be a tedious and error-prone task.

Aspects of the present disclosure support techniques for defining data transformation logic that is executed by a gateway of a federation management service, such that the federation management service may compute new data fields from one or more data sources on the fly (e.g., at federation runtime), without modifying underlying data sources. In some cases, the federation management service may receive an input from a user via a user interface that indicates data sources as federation inputs to a federated API. For example, the input may be a full name, where the first name is at a first data source and the last name is at a second data source. The data sources may have metadata inputs that define a target schema for a computed field (e.g., full name), a transformation for computing a value for the field from a data source schema to the target schema. The runtime service of the federation management service may compute the value of the field using the transformation (e.g., may combine a first name field and last name field to obtain a full name field). For example, the runtime service may apply the transformation to one or more data source schemas. The federation management service may generate a federated API from the data sources that includes the computed field.

In some cases, the runtime service may apply the transformation for a source-based integration. That is, the data transformations may be defined at a data source level, and may be treated as a component of the federation unit for a particular data source. As such, when a data source is added to the federated schema, a pre-processing step first partially unifies the source schema with the schema of the federated API, and then generates the final schema for the source. The federation management service may unify the final schema with the other data sources for the federated API. In some other cases, the runtime service may apply the transformation for federation-schema integration. That is, the runtime service may compute the field over a unified schema generated by the federation management service. As such, the computed field may be treated as a federation unit that is separate from the federation unit corresponding to the data source. The federation units corresponding to the data sources and the federation units corresponding to the computed field transformations are then federated together into the unified schema of the federated API, and the computations are done on the fly at the level of the federated API.

Aspects of the present disclosure may be implemented to realize one or more of the following advantages. The described techniques may result in higher user satisfaction, reduced manual interaction, and greater processing efficiency, among other examples. More specifically, the techniques described herein may enable users of a federation management service to specify inputs for fields from different data sources of a federated API without having to modify the underlying data sources. Using transformations for computing a field from one or more data sources of a federated API may result in fewer errors and less manual intervention (in comparison to conventional solutions that utilize code wrappers and source code modifications).

Aspects of the disclosure are initially described in the context of an environment supporting an on-demand database service. Aspects of the disclosure are further described with respect to a computing environment illustrating federated API generation and subgraph generation and a process flow. Aspects of the disclosure are further illustrated by and described with reference to apparatus diagrams, system diagrams, and flowcharts that relate to data transformations for data sources of a federated API.

FIG. 1 illustrates an example of a system 100 for cloud computing that supports data transformations for data sources of a federated API in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured). Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In accordance with aspects of the present disclosure, a federation management service supported by the cloud platform 115 may receive an input from a user via a user interface that indicates data sources as federation inputs to a federated API. For example, the input may be a full name, where the first name is at a first data source and the last name is at a second data source. The data sources may have metadata inputs that define a target schema for a computed field (e.g., full name), a transformation for computing a value for the field from a data source schema to the target schema. The runtime service of the federation management service may compute the value of the field using the transformation (e.g., may combine a first name field and last name field to obtain a full name field). For example, the runtime service may apply the transformation to one or more data source schemas. The federation management service may generate a federated API from the data sources that includes the computed field.

Aspects of the data processing system 100 may be implemented to realize one or more of the following advantages. The described techniques may result in higher user satisfaction, reduced manual interaction, and greater processing efficiency, among other examples. More specifically, the techniques described herein may enable users of a federation management service to specify inputs for fields from different data sources of a federated API without having to modify the underlying data sources. Using transformations for computing a field from one or more data sources of a federated API may result in fewer errors and less manual intervention (in comparison to conventional solutions that utilize code wrappers and source code modifications).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
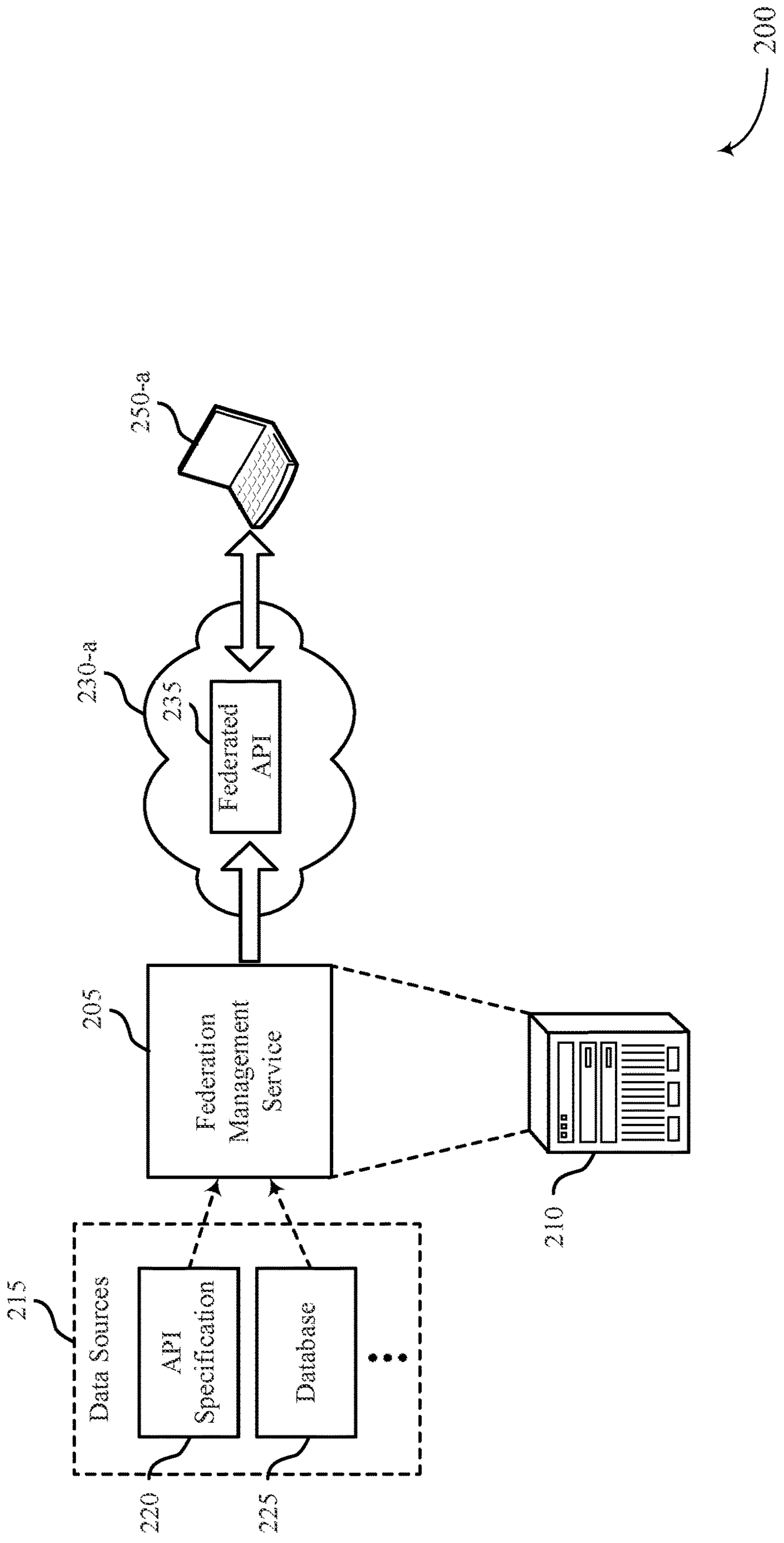
FIG. 2 illustrates an example of a computing environment that supports data transformations for data sources of a federated API in accordance with aspects of the present disclosure.

FIG. 2 illustrates an example of a computing environment 200 that supports data transformations for data sources of a federated API in accordance with aspects of the present disclosure. The computing environment 200 may implement or be implemented by aspects of the data processing system 100. For example, the computing environment 200 may include a server 210, hosts 230, and client devices 250. The server 210 may be an example of aspects of the cloud platform 115 or the sub-system 125, as described with reference to FIG. 1. The server 210 may represent various physical or logical computing systems that support a federation management service 205 that can be used by clients or tenants (e.g., a cloud client 105 described with reference to FIG. 1) to access applications via client devices 250.

Some applications (e.g., client applications executing on client devices 250, web services, or cloud servers) may retrieve data from multiple data sources, such as data sources 215. For example, an application (or a service supported by an application) may provide a status of an online purchase order, and the application may retrieve data related to shipping information from a first data source, data related to order status information from a second data source, and data related to the item being purchased from a third data source. The application may interface with these data sources using respective APIs. The data sources may include RESTful APIs, Async APIs, gRPC APIs, databases, or the like. Conventional techniques for retrieving data or accessing services may require configuring multiple APIs at an application and configuring the application to process data received from the multiple APIs (e.g., by merging or linking fields via hard-coded relationships).

The federation management service 205 described herein may support the creation of a federated API 235 that provides access to multiple data sources 215. In such examples, a user (e.g., an API architect or administrator) may declaratively link elements from multiple APIs using a user interface. The federation management service 205 may generate a new API having a unified schema that incorporates the linked elements across the multiple data sources 215. In some examples, the federated API may be referred to as a DataGraph. The federation management service 205 may support a user interface that allows a user to select multiple data sources 215 that are to be included in the federated API 235.

The user may also select various deployment configurations, such as a host environment (e.g., a host 230-*a*, which may be an example of cloud environment), endpoint details, authentication details, and the like. After selecting configuration parameters, the federation management service 205 may ingest or process the data sources 215 (such as an API 220 or a database 225) to generate the federated API 235. The federated API 235 may be deployed at the host environment (e.g., the host 230-*a*) based on the user-selected parameters. In some examples, the federated API 235 may be deployed in a cloud environment (e.g., the host 230-*a*). Additionally, or alternatively, the federated API 235 may be deployed at a local host (e.g., a host associated with or supported by the server 210) or a host associated with a tenant or cloud client.

An application or client (e.g., an application or client executing on a client device 250-*b*) may be configured to access data and services supported by the underlying data sources 215 via an endpoint of the federated API 235. As such, rather than accessing the data from multiple data source endpoints (for each for the data sources 215), the application may be configured to access the data using one or more endpoints of the federated API 235, which may support improved computing efficiency (at the application and the hosts 230) and reduced complexity. However, in some examples, a federated API may expose the some or all of the data from the underlying data sources 215. This exposure may cause some features of the data sources 215 (such as confidential information or experimental elements) to be exposed to end users (e.g., the client device 250-*a*).

In accordance with aspects of the present disclosure, a federation management service 205 may receive an input from a client device 250 via a user interface that indicates data sources 215 as federation inputs to a federated API 235. For example, the input may be a full name, where the first name is at a first data source 215 and the last name is at a second data source 215. The data sources 215 may have metadata inputs that define a target schema for a computed field (e.g., full name), a transformation for computing a value for the field from a data source schema to the target schema. The runtime service of the federation management service may compute the value of the field using the transformation (e.g., may combine a first name field and last name field to obtain a full name field). For example, the runtime service may apply the transformation to one or more data source schemas. The federation management service may generate a federated API 235 from the data sources 215 that includes the computed field.

Aspects of the computing environment 200 may be implemented to realize one or more of the following advantages. The described techniques may result in higher user satisfaction, reduced manual interaction, and greater processing efficiency, among other examples. More specifically, the techniques described herein may enable users of a federation management service 205 to specify inputs for fields from different data sources 215 of a federated API 235 without having to modify the underlying data sources 215. Using transformations for computing a field from one or more data sources 215 of a federated API 235 may result in fewer errors and less manual intervention (in comparison to conventional solutions that utilize code wrappers and source code modifications).

Figure 3:
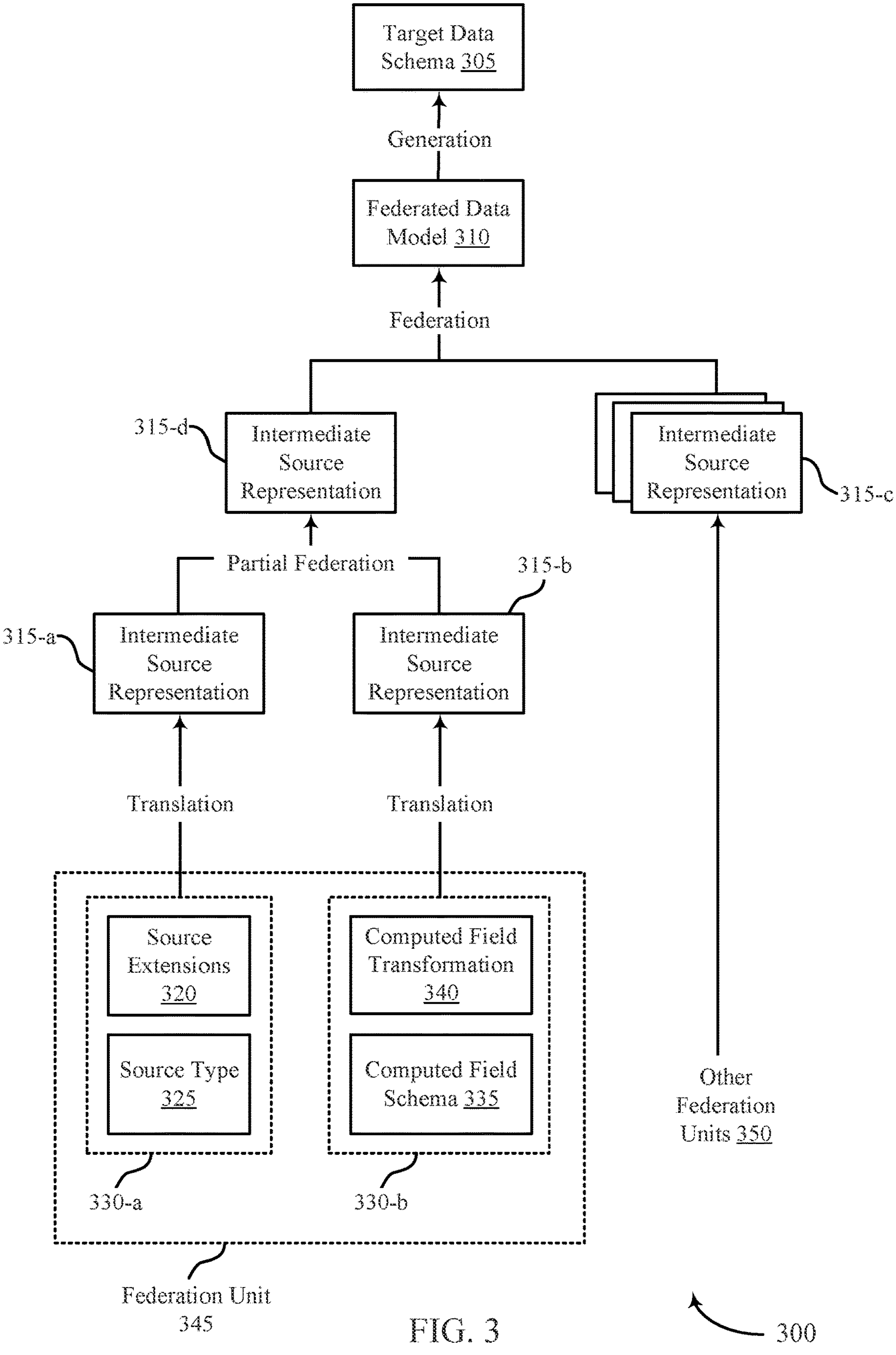
FIGS. 3 and 4 illustrate examples of system diagrams that support data transformations for data sources of a federated API in accordance with aspects of the present disclosure.

FIG. 3 illustrates an example of a system diagram 300 that supports data transformations for data sources of a federated API in accordance with aspects of the present disclosure. The system diagram 300 may implement or be implemented by aspects of the data processing system 100 or the computing environment 200. For example, the system diagram 300 may include a data source 330, which may be an example of a data source 215 described with reference to FIG. 2. The system diagram 300 illustrates metadata processing from source APIs to compute a new field (e.g., at a data-source level for source-based integration) for a translated federated schema.

As described with reference to FIGS. 1 and 2, a federation management service (e.g., the federation management service 205 described with reference to FIG. 2) may receive a user selection of one or more data sources, such as the data source 330-*a*, the data source 330-*b*, or both, via a user interface of the federation management service. In some examples, one or more of the data sources may be associated with different source types. For example, the data sources 330-*a*, the data source 330-*b*, or both may be associated with a source type 325 (e.g., GraphQL, representational state transfer (REST), asynchronous (Async), or the like). Each of the data sources, including the data source 330-*a* and the data source 330-*b*, may be configured with a set of source extensions. For example, the data sources may include a source extension 320. The federation management service (also referred to as an intermediate metadata federation layer) may use the source extension 320 to generate an extended graph of the data source 330-*a* and the data source 330-*b*.

In some cases, a user may indicate multiple data sources in the user selection (e.g., the data source 330-*a* and the data source 330-*b*), which the federation management service may use as federation inputs to the federated API, which may include the target data schema 305. The federation management service may generate the target data schema from the data sources (APIs, databases, etc.). For example, the federation management service may federate the fields as they exist in the data sources. As such, to generate a new field (e.g., by combining data from multiple fields) that is to exist in the target data schema 305, a user may change the code of the data sources (e.g., manually). In some other examples, the user may create a new API that performs the computation that generates the new field, and the new API could serve as a data source to the federated API. However, these techniques both use manual coding at the level of the data sources, and are therefore potentially burdensome and error prone, and may not be feasible if the administrator of the federated API is not the owner of the data sources. That is, there may be a mismatch in a schema to access the data sources independently (e.g., in a stand-alone manner) and a schema to access fields of the target data schema 305. Additionally, or alternatively, the user may adapt the schema of the data sources for the federation protocol without changing the actual implementation of the data sources (e.g., because the operator of the federated API may not own the federated service, or because the change may not be convenient for the individual consumption of the data sources).

Thus, as described herein, the federation management service may perform a data integration task in a target data schema without additional code using declarative data transformation language (JSON pointer, JSON Path, DataWeave, Google CDL, Velocity templates, etc.). In some cases, as illustrated in FIG. 3, the federation management service may perform a source-based integration in which a source API schema, such as the data source 330-*b*, is adapted prior to being added to the target data schema. In some other cases, the federation management service may perform a federated-schema integration in which the fields of the data source 330-*b* are adapted during federation of the target schema, which is described in further detail with respect to FIG. 4.

In some examples, an upstream data source 330-*b*, such as an upstream API, may include data for one or more fields to be added to the target data schema 305. For example, the data source 330-*b* may include a computed field schema 335, which may be a target schema for a computed field. The federation management service may identify the computed field schema 335 based on a metadata input from a user interface. In some cases, the data source 330-*b* may include a computed field transformation 340, which may be a logical transformation for computing a value of the new field in the computed field schema 335 from the original data source schema for the data source 330-*b* (e.g., prior to applying the logical transformation). Thus, the upstream data source 330-*b* may include information similar to the data source 330-*a* (e.g., a source type 325, source extensions 320, and the like for an annotated source API) and a set of declarative information about additional fields that perform data transformations over the data of the data source 330-*b*, such as the computed field schema 335 and the computed field transformation 340.

In some cases, the metadata of the computed field schema 335 may include a target schema for the adapted field, a declarative transformation in a supported language (JSON pointer, JSON Path, DataWeave, Google CDL, Velocity templates, etc.) describing the data transformation from the data source schema into the target schema for the field, an optional hypertext transfer protocol (HTTP) request template that indicates how to extract the information for the computed field, or any combination thereof. The federation management service may treat the metadata as a single unit and may process the metadata together when performing federation to obtain the target data schema 305.

For example, the federation management service may use the source extensions 320, a parsing plugin, metadata format information, semantic extension definitions, or a combination thereof to generate intermediate source representations, such as an intermediate source representation 315-*a* through an intermediate source representation 315-*d*, of one or more data sources. For example, the federation management system may generate an intermediate source representation 315-*a* of the data source 330-*a* and an intermediate source representation 315-*b* of the data source 330-*b*. The federation management system may perform partial federation of the intermediate source representation 315-*a* and the intermediate source representation 315-*b* from the federation unit 345 to obtain the intermediate source representation 315-*d*. Similarly, the federation management system may perform one or more additional partial federations of data sources from other federation units 350 to obtain the intermediate source representation 315-*c*. There may be any number of other federation units 350, which may produce any number of intermediate source representations. The intermediate source representations may have a common feature set that is supported by the federation management service. The common feature set may include read operations, write operations, pagination capabilities, streaming capabilities, etc.

After translating the data sources into the intermediate source representations, the federation management service may integrate the intermediate source representations (also referred to as intermediate data sources) into a federated data model 310. Accordingly, the federation management service may generate a target data schema 305 for a federated API (e.g., the federated API 235 described with reference to FIG. 2) based on the federated data model 310. Once configured, the federated API may include the computed field from the computed field transformation 340 and computed field schema 335 of the data source 330-*b*.

In some examples, the user input may indicate a string value, such as a full name of a user that includes a first name and a surname. The first name may be at a different data source than the surname. For example, the data source 330-*b* may include the first name and a data source of the other federation units 350 may include the surname. In some other examples, a same federation unit may include both the first name and the surname (e.g., the data source 330-*a* and the data source 330-*b* of the federation unit 345 may include the first name and surname fields). For an API that generates a federated schema after being transformed, a user may declare a computed field with a target schema for the field and the logical transformation for the field (e.g., a DataWeave script including the transformation). For example, the user may indicate the target data schema 305 and the computed field transformation 340.

In some examples, the logical transformation may include a transformation that combines external values and returns a final computed value (e.g., a "fullName" field with a first name and a surname). When the data source 330-*a* and the data source 330-*b* are added to the target data schema 305, a pre-processing step first partially unifies the intermediate source representation 315-*b* of the data source 330-*b* with the intermediate source representation 315-*a* of the data source 330-*a*. Then, the federation management system may generate the final schema (e.g., the target data schema 305) for the data sources that is unified with the rest of API sources for the federated API. The federation management system may remove one or more source types 325 of the data sources (e.g., for the federation mechanism, both API and computed field may be a single unit). In some cases, the input fields for the adapted field are provided by the data source that is being adapted. For example, if the data source 330-*b* includes a first name field as the computed field, the data source schema may provide the input fields to the federation management system.

In some cases, the federation management system may remove (e.g., delete) fields based on values of the transformation not matching the values of the fields, or the values of the external fields for the transformation not matching fields provided by the data source being federated. The federation management system may store information about the transformation and inputs in the metadata that is used to configure a runtime federation gateway (e.g., the runtime engine that computes the new field on the fly). For example, when the computed field is invoked in a runtime query, the federation gateway may fetch a input field and may apply the transformation through a runtime engine for the data integration language before returning the final value for the field, which is described in further detail with respect to FIG. 5.

Figure 4:
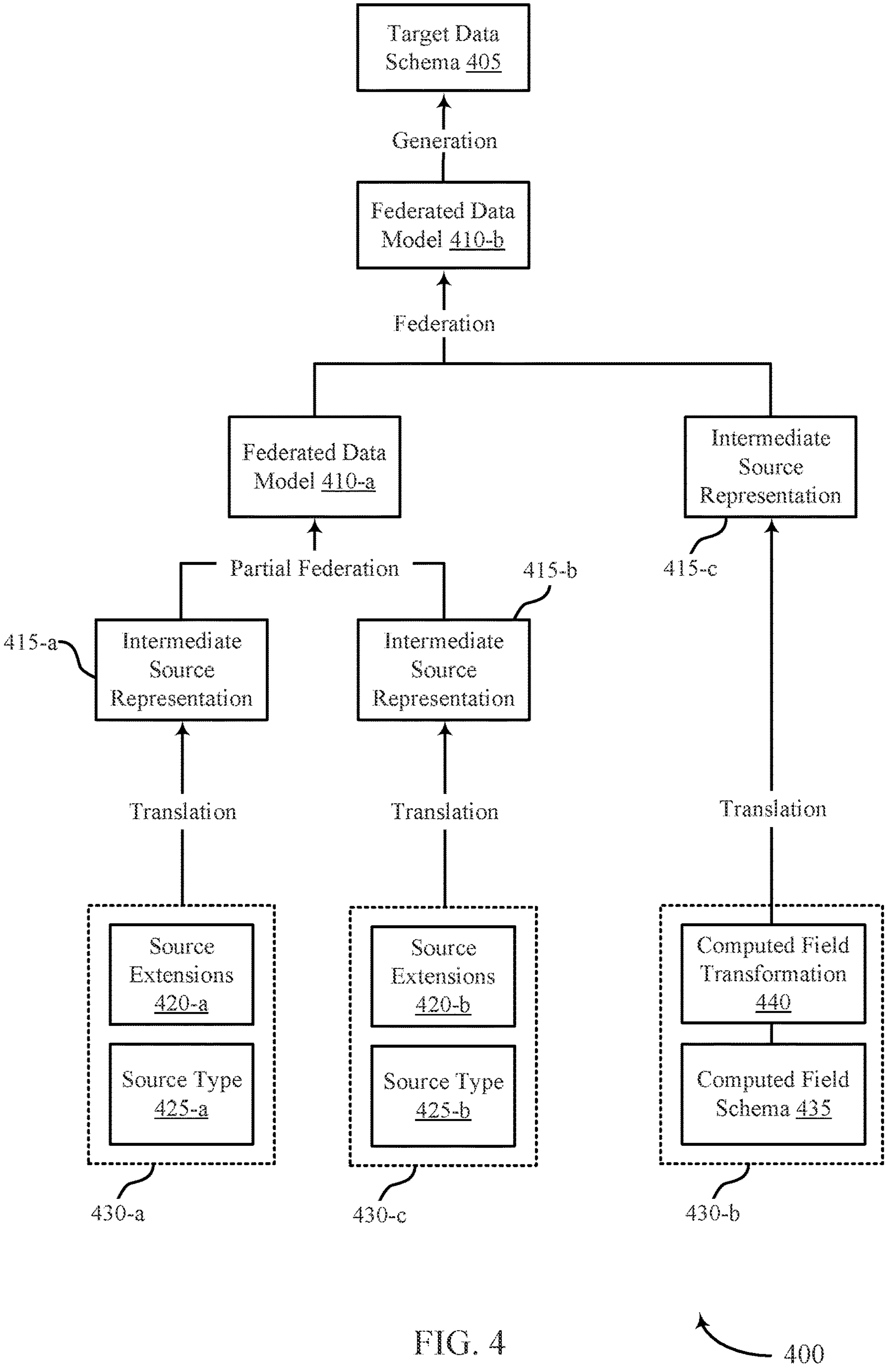

FIG. 4 illustrates an example of a system diagram 400 that supports data transformations for data sources of a federated API in accordance with aspects of the present disclosure. The system diagram 400 may implement or be implemented by aspects of the data processing system 100, the computing environment 200, or the system diagram 300. For example, the system diagram 400 may include a data source 430-*a*, a data source 430-*b*, and a data source 430-*c*, which may be an example of a data source 215 described with reference to FIG. 2. The system diagram 300 illustrates metadata processing from source APIs to compute a new field (e.g., at a federation level for federated-schema integration) for a translated federated schema.

As described with reference to FIGS. 1 and 2, a federation management service (e.g., the federation management service 205 described with reference to FIG. 2) may receive a user selection of one or more data sources, such as the data source 430-*a*, the data source 430-*b*, the data source 430-*c*, or any combination thereof, via a user interface of the federation management service. In some examples, one or more of the data sources may be associated with different source types. For example, the data source 430-*a* may have a source type 425-*a*, while the data source 430-*c* may have a source type 425-*b* (e.g., GraphQL, representational state transfer (REST), asynchronous (Async), or the like). The data source 430-*a*, the data source 430-*b*, and the data source 430-*c* may have any source type. Each of the data sources, including the data source 430-*a*, the data source 430-*b*, and the data source 430-*c*, may be configured with a set of source extensions. For example, the data source 430-*a* may include a source extension 420-*a* and the data source 430-*c* may include a source extension 420-*b*. The federation management service (also referred to as an intermediate metadata federation layer) may use the source extension to generate an extended graph of the data source 430-*a*, the data source 430-*b*, and the data source 430-*c*.

In some cases, a user may indicate multiple data sources in the user selection (e.g., the data source 430-*a*, the data source 430-*b*, and the data source 430-*c*), which the federation management service may use as federation inputs to the federated API, which may include the target data schema 405. The federation management service may generate the target data schema from the data sources (APIs, databases, etc.). For example, the federation management service may federate the fields as they exist in the data sources. As such, to generate a new field (e.g., by combining data from multiple fields) that is to exist in the target data schema 405, a user may change the code of the data sources (e.g., manually). In some other examples, the user may create a new API that performs the computation that generates the new field, and the new API could serve as a data source to the federated API. However, these techniques both use manual coding at the level of the data sources, and are therefore potentially burdensome and error prone, and may not be feasible if the administrator of the federated API is not the owner of the data sources. That is, there may be a mismatch in a schema to access the data sources independently (e.g., in a stand-alone manner) and a schema to access fields of the target data schema 405. Additionally, or alternatively, the user may adapt the schema of the data sources for the federation protocol without changing the actual implementation of the data sources (e.g., because the operator of the federated API may not own the federated service, or because the change may not be convenient for the individual consumption of the data sources).

Thus, as described herein, the federation management service may perform a data integration task in a target data schema without additional code using declarative data transformation language (JSON pointer, JSON Path, DataWeave, Google CDL, Velocity templates, etc.). In some cases, as illustrated in FIG. 4, the federation management service may perform a federated-schema-based integration in which a computed field is computed over the unified schema generated by the federation service. Thus, input fields for the new computed field may originate in any field, and any underlying upstream data source, available in the federated schema. For example, the new computed field may originate at least in the data source 430-*b*.

In some examples, an upstream data source 430-*b*, such as an upstream API, may include data for one or more fields to be added to the target data schema 405. For example, the data source 430-*b* may include a computed field schema 435, which may be a target schema for a computed field. The federation management service may identify the computed field schema 435 based on a metadata input from a user interface. In some cases, the data source 430-*b* may include a computed field transformation 440, which may be a logical transformation for computing a value of the new field in the computed field schema 435 from the original data source schema for the data source 430-*b* (e.g., prior to applying the logical transformation). Thus, the upstream data source 430-*b* may include information similar to the data source 430-*a* (e.g., a source type, source extensions, and the like for an annotated source API) and a set of declarative information about additional fields that perform data transformations over the data of the data source 430-*b*, such as the computed field schema 435 and the computed field transformation 440.

In some cases, the metadata of the computed field schema 435 may include a target schema for the adapted field, a declarative transformation in a supported language (JSON pointer, JSON Path, DataWeave, Google CDL, Velocity templates, etc.) describing the data transformation from the data source schema into the target schema for the field, an optional hypertext transfer protocol (HTTP) request template that indicates how to extract the information for the computed field, or any combination thereof. The federation management service may treat the metadata as a single unit and may process the metadata together when performing federation to obtain the target data schema 405.

For example, the federation management service may use the source extensions, a parsing plugin, metadata format information, semantic extension definitions, or a combination thereof to generate intermediate source representations, such as an intermediate source representation 415-*a* through an intermediate source representation 415-*c*, of one or more data sources. For example, the federation management system may generate an intermediate source representation 415-*a* of the data source 430-*a*, an intermediate source representation 415-*b* of the data source 430-*c*, and an intermediate source representation 415-*c* of the data source 430-*b*. The federation management system may perform partial federation of the intermediate source representation 415-*a* and the intermediate source representation 415-*b* from the data source 430-*a* and the data source 430-*c* to obtain a federated data model 410-*a*. There may be any number of partial federations of intermediate source representations, which may produce any number of federated data models. In some cases, the intermediate source representations may have a common feature set that is supported by the federation management service. The common feature set may include read operations, write operations, pagination capabilities, streaming capabilities, etc.

After translating the data sources into the intermediate source representations, the federation management service may integrate the intermediate source representations (also referred to as intermediate data sources) and any additional federated data models produced from partial federation (e.g., the federated data model 410-*a*) into a federated data model 410-*b*. Accordingly, the federation management service may generate a target data schema 405 for a federated API (e.g., the federated API 235 described with reference to FIG. 2) based on the federated data model 410-*b*. Once configured, the federated API may include the computed field from the computed field transformation 440 and computed field schema 435 of the data source 430-*b*.

In some examples, the user input may indicate a string value, such as a full name of a user that includes a first name and a surname. The first name may be at a different data source than the surname. For example, the data source 430-*b* may include the first name and a different data source may include the surname. In some other examples, a same data source may include both the first name and the surname (e.g., the data source 430-*b* may include the first name and surname fields). In some examples, user may declare a computed field with a target schema for the field and the logical transformation for the field (e.g., a DataWeave script including the transformation). For example, the user may indicate the target data schema 405 and the computed field transformation 440.

In some examples, the logical transformation may include a transformation that combines external values and returns a final computed value (e.g., a "fullName" field with a first name and a surname). The federation management system may remove one or more source types of the data sources (e.g., for the federation mechanism, both API and computed field may be a single unit). In some cases, the input fields for the adapted field are provided by the data source that is being adapted. For example, if the data source 430-*b* includes a first name field as the computed field, the data source schema 430-*b* may provide the input fields to the federation management system.

In some cases, the computed field information (e.g., the computed field transformation 440 and the computed field schema 435) may be in a federation unit separated from data sources without computed field information. For example, the data source 430-*a* and the data source 430-*c* may be in a federation unit separated from the data source 430-*b*. The transformation for the computed field input the federated schema for multiple data sources, not the schema of an individual data source. Thus, one or more external fields may exist in the federated schema (e.g., the federated data model 410-*b*). In some cases, the federation management system may generate a federated schema, such as the federated data model 410-*a*, processing the schemas for one or more data sources (e.g., the data source 430-*a* and the data source 430-*c*). Then a post-processing step computes any computed field declared taking as input the generated federated schema fields (e.g., from the federated data model 410-*a*) and unifies them into the final federated schema, such as the federate data model 410-*b*. Instead of fetching the external field information from a single data source, the federation management system may invoke multiple data sources depending on how many federated APIs are providing the information for the computed field.

In some examples, the federation management system may combine the federation-schema-based integration of computed fields, as described herein, with the source-based integration, as described with reference to FIG. 3. Thus, a final federated schema may include any combination of source APIs with and without source-based computed fields and an arbitrary number of federated-schema based computed fields.

Figure 5:
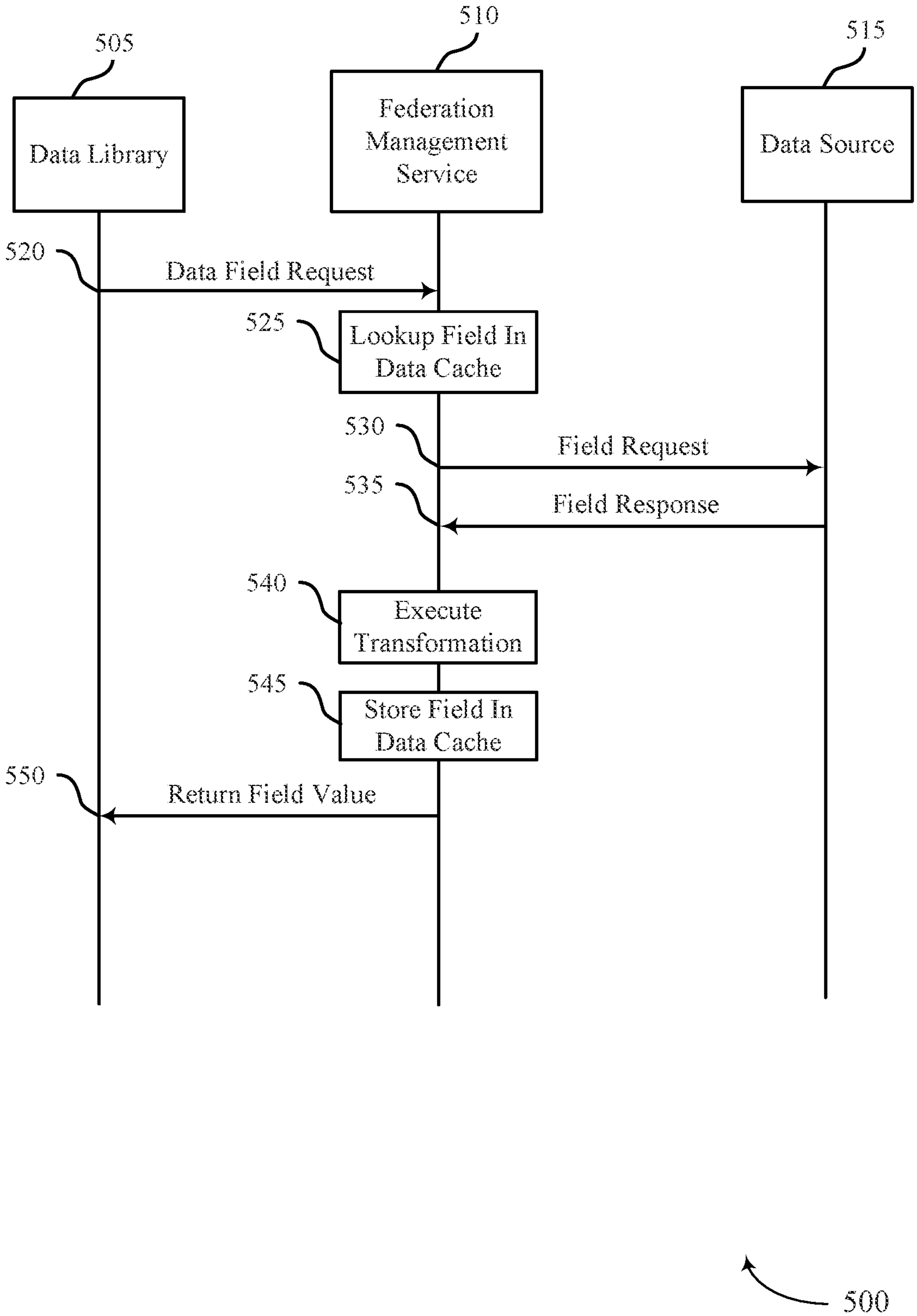
FIGS. 5 and 6 illustrate examples of process flows that support data transformations for data sources of a federated API in accordance with aspects of the present disclosure.

FIG. 5 illustrates an example of a process flow 500 that supports data transformations for data sources of a federated API in accordance with aspects of the present disclosure. The process flow 500 may be implemented by aspects of the data processing system 100, the computing environment 200, the system diagram 300, or the system diagram 400. The process flow 500 may include a data library 505, a federation management service 510, and a data source 515, which may be examples of the corresponding devices or systems as described with respect to FIGS. 1 through 4. The federation management service 510 may be implemented by one or more servers, as described with respect to FIG. 2. In some examples, some signaling or procedure of the process flow 500 may occur in different orders than shown. Additionally, or alternatively, some additional procedures of signaling may occur, or some signaling or procedures may not occur.

At 520, the federation management service 510, may receive a data field request from the data library. Then, at 525, the federation management service 510 may lookup the field in a data cache at the federation management service. The federation management service may be an example of a federation engine. The data field request may request any number of data fields, such as a first name field and a last name field. The federation management service may use a source-based integration, as described with reference to FIG. 3, a federated-schema-based integration, as described with reference to FIG. 4, or both to transform the fields into a new computed field in a federated API.

At 530, the federation management service may send a field request to the data source 515 to acquire a field value for at least one field of the any number of data fields. At 535, the data source 515 may respond with the values of the fields.

At 540, the federation management service may execute a transformation. For example, the transformation may be a script including transformation logic for transforming one or more fields. For example, the fields may be concatenated. At 545, the federation management service may store the field in a data cache.

At 550, the federation management service may return the field value to the data library.

Figure 6:
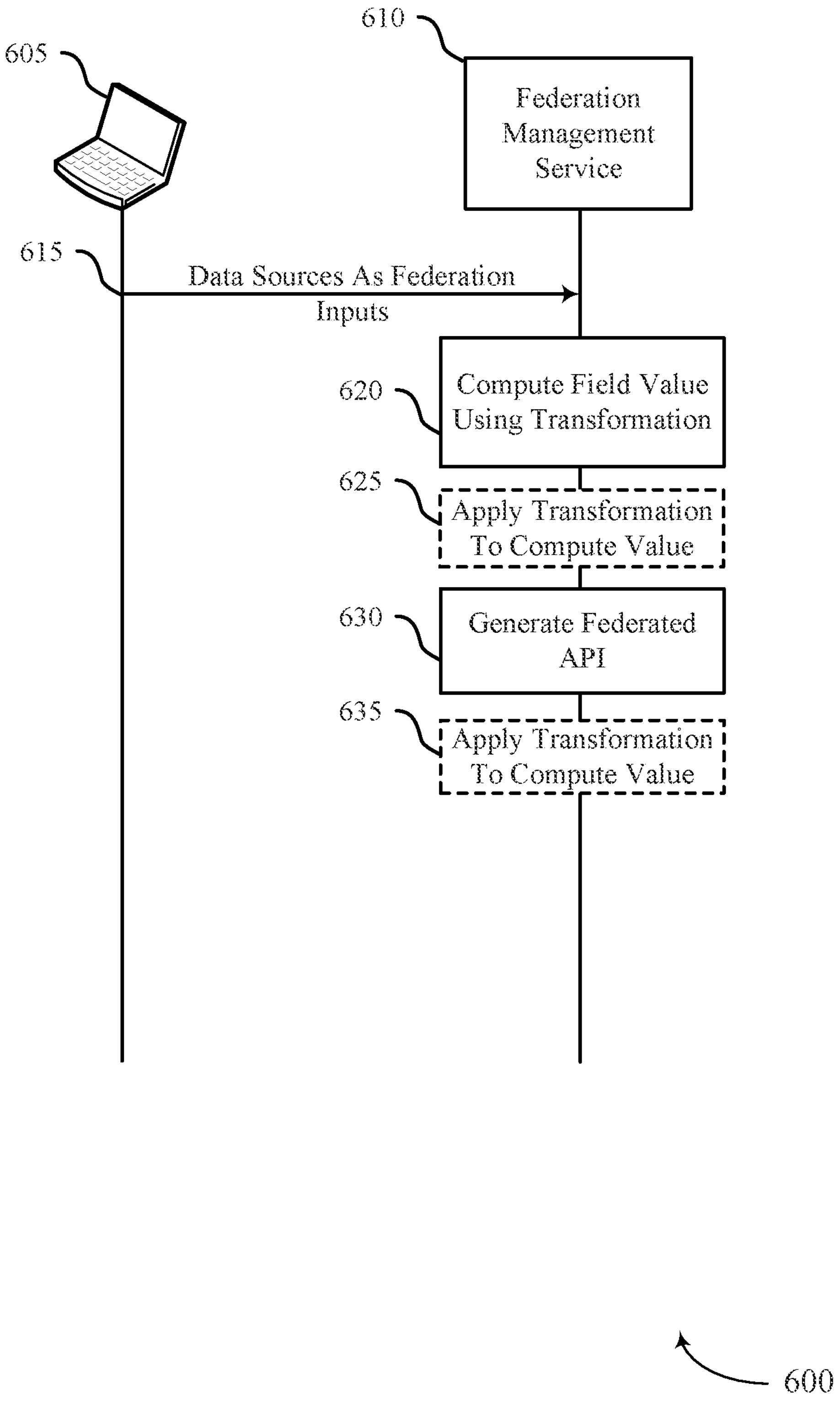

FIG. 6 illustrates an example of a process flow 600 that supports data transformations for data sources of a federated API in accordance with aspects of the present disclosure. The process flow 600 may be implemented by aspects of the data processing system 100, the computing environment 200, the system diagram 300, the system diagram 400, or the process flow 500. The process flow 600 may include a client device 605 and a federation management service 610, which may be examples of the corresponding devices or systems as described with respect to FIGS. 1 through 5. The federation management service 610 may be implemented by one or more servers, as described with respect to FIG. 2. In some examples, some signaling or procedure of the process flow 600 may occur in different orders than shown. Additionally, or alternatively, some additional procedures of signaling may occur, or some signaling or procedures may not occur.

At 615, the client device 605 may send a user input to the federation management service 610 (e.g., via a user interface of the federation management service 610) indicating one or more data sources as federation inputs to a federated API. The one or more data sources may have one or more metadata inputs, such as a first metadata input that defines a target schema for a computed field and a second metadata input that defines a transformation for computing a value for the computed field from a data source schema to the target schema for the computed field. In some cases, the transformation may combine multiple fields from the data sources to obtain the computed field using the user input.

At 620, the federation management service 610 may compute the value of the computed field using a metadata input (e.g., the second metadata input). A runtime service of the federation management service 610 may compute the value. In some examples, to compute the value of the computed field, the federation management service 610 may configure the runtime service by storing the metadata inputs. The federation management service 610 may fetch the metadata inputs from the data source schema during runtime (e.g., by the runtime service). The federation management service 610 may apply the transformation to the data source schema, the federated API, or both via the runtime service to obtain the value of the computed field.

In some cases, at 625, the federation management service may apply the transformation for computing the value for the computed field prior to generating a federated API, where the target schema is a version of the data source schema, as described with reference to FIG. 3. In some examples, to compute the value of the computed field, the federation management service 610 may configure the runtime service by storing the metadata inputs. The federation management service 610 may fetch the metadata inputs from the data source schema during runtime (e.g., by the runtime service). The federation management service 610 may apply the transformation to the federated API via the runtime service to obtain the value of the computed field.

At 630, the federation management service 610 may generate the federated API from the data sources, where the federated API includes the computed field. For example, the federation management service 610 may generate the federated API by unifying the version of the data source schema with the data sources for the federated API.

In some other cases, at 635, the federation management service 610 may apply the transformation for computing the value for the computed field after generating the federated API, where the target schema is the federated API, as described with reference to FIG. 4. In some examples, to compute the value of the computed field, the federation management service 610 may configure the runtime service by storing the metadata inputs. The federation management service 610 may fetch the metadata inputs from the data source schema during runtime (e.g., by the runtime service). The federation management service 610 may apply the transformation to the data source schema via the runtime service to obtain the value of the computed field. In some cases, the federation management service 610 may compute one or more values of the one or more fields (e.g., including the computed field) based on inputting one or more fields of the federated API.

In some examples, the federated API may include the computed field. That is, the federation management service 610 may determine that one or more data sources and the federated API include a first set of fields prior to generating the federated API. After generating the federated API, the one or more data sources and the federated API may include a second set of fields including the computed field.

Figure 7:
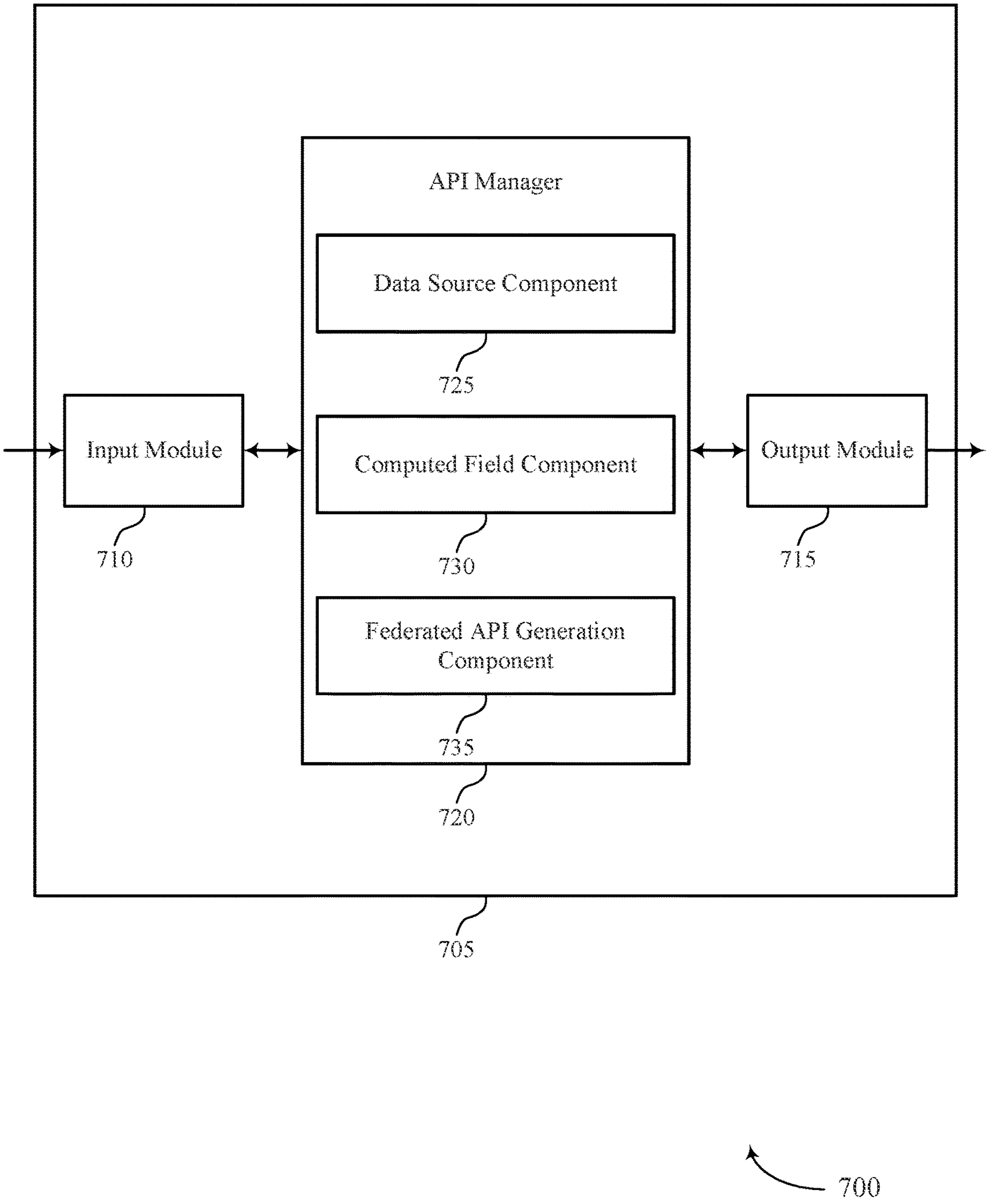
FIG. 7 shows a block diagram of an apparatus that supports data transformations for data sources of a federated API in accordance with aspects of the present disclosure.

FIG. 7 shows a block diagram 700 of a device 705 that supports data transformations for data sources of a federated API in accordance with aspects of the present disclosure. The device 705 may include an input module 710, an output module 715, and a API manager 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the API manager 720 to support data transformations for data sources of a federated API. In some cases, the input module 710 may be a component of an I/O controller 910 as described with reference to FIG. 9.

The output module 715 may manage output signals for the device 705. For example, the output module 715 may receive signals from other components of the device 705, such as the API manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910 as described with reference to FIG. 9.

For example, the API manager 720 may include a data source component 725, a computed field component 730, a federated API generation component 735, or any combination thereof. In some examples, the API manager 720, or various components thereof, may be configured to perform various operations (e.g., receiving, monitoring, transmitting) using or otherwise in cooperation with the input module 710, the output module 715, or both. For example, the API manager 720 may receive information from the input module 710, send information to the output module 715, or be integrated in combination with the input module 710, the output module 715, or both to receive information, transmit information, or perform various other operations as described herein.

The API manager 720 may support data processing in accordance with examples as disclosed herein. The data source component 725 may be configured as or otherwise support a means for receiving, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field. The computed field component 730 may be configured as or otherwise support a means for computing, by a runtime service of the federation management service, the value of the computed field using the second metadata input. The federated API generation component 735 may be configured as or otherwise support a means for generating, using the federation management service, the federated API from the set of multiple data sources, where the federated API includes the computed field.

Figure 8:
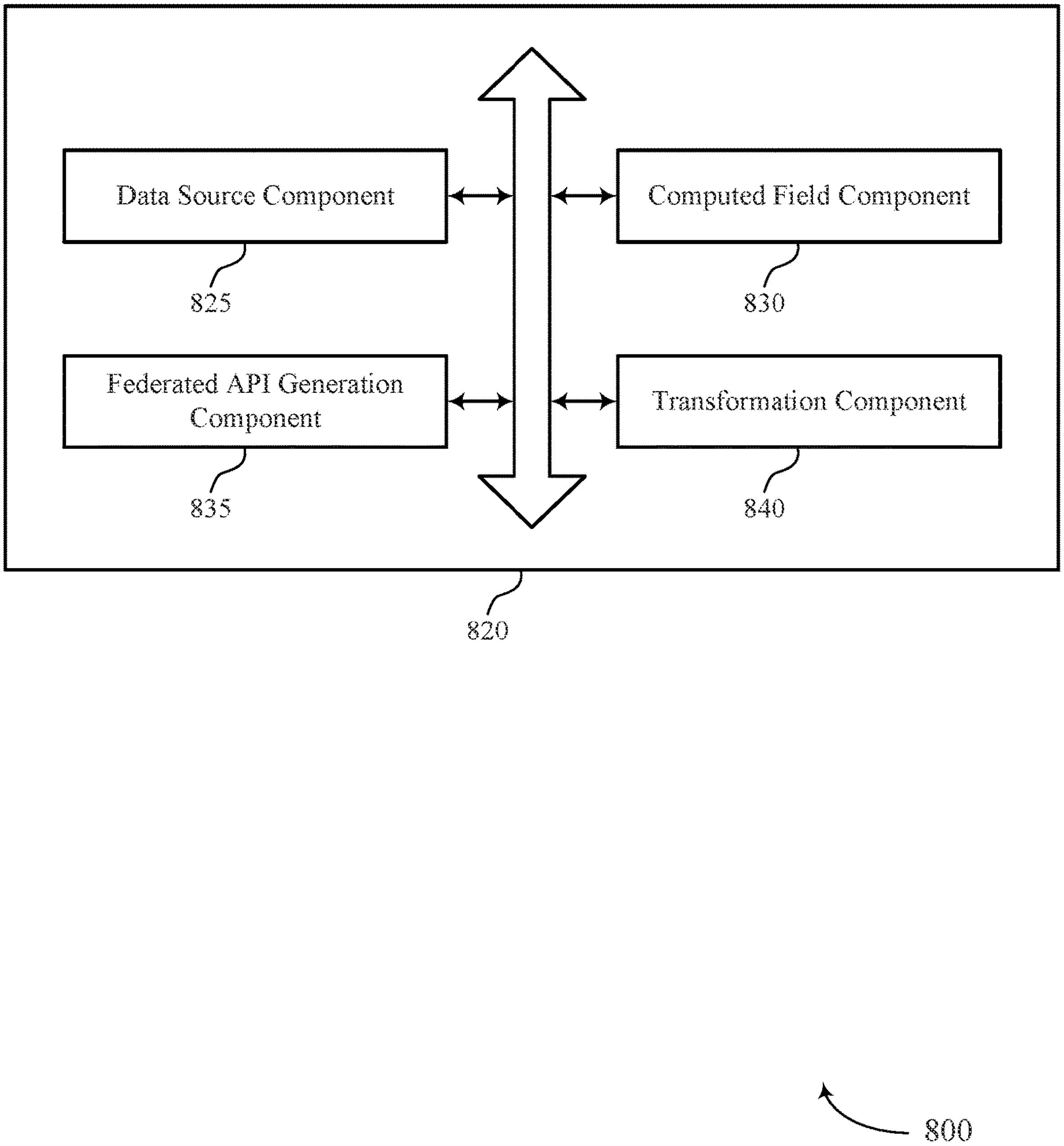
FIG. 8 shows a block diagram of an API manager that supports data transformations for data sources of a federated API in accordance with aspects of the present disclosure.

FIG. 8 shows a block diagram 800 of a API manager 820 that supports data transformations for data sources of a federated API in accordance with aspects of the present disclosure. The API manager 820 may be an example of aspects of a API manager or a API manager 720, or both, as described herein. The API manager 820, or various components thereof, may be an example of means for performing various aspects of data transformations for data sources of a federated API as described herein. For example, the API manager 820 may include a data source component 825, a computed field component 830, a federated API generation component 835, a transformation component 840, or any combination thereof. Each of these components may communicate, directly or indirectly, with one another (e.g., via one or more buses).

The API manager 820 may support data processing in accordance with examples as disclosed herein. The data source component 825 may be configured as or otherwise support a means for receiving, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field. The computed field component 830 may be configured as or otherwise support a means for computing, by a runtime service of the federation management service, the value of the computed field using the second metadata input. The federated API generation component 835 may be configured as or otherwise support a means for generating, using the federation management service, the federated API from the set of multiple data sources, where the federated API includes the computed field.

In some examples, the transformation component 840 may be configured as or otherwise support a means for applying the transformation for computing the value for the computed field prior to generating the federated API, where the target schema is a version of the data source schema.

In some examples, to support computing the value of the computed field, the computed field component 830 may be configured as or otherwise support a means for configuring the runtime service based on storing the first metadata input, the second metadata input, or both. In some examples, to support computing the value of the computed field, the computed field component 830 may be configured as or otherwise support a means for fetching, by the runtime service from the data source schema, the first metadata input, the second metadata input, or both. In some examples, to support computing the value of the computed field, the transformation component 840 may be configured as or otherwise support a means for applying the transformation to the data source schema via the runtime service, where the value of the computed field is based on applying the transformation.

In some examples, the federated API generation component 835 may be configured as or otherwise support a means for generating the federated API based on unifying the version of the data source schema with the set of multiple data sources for the federated API.

In some examples, the transformation component 840 may be configured as or otherwise support a means for applying the transformation for computing the value for the computed field after generating the federated API, where the target schema corresponds to the federated API.

In some examples, to support computing the value of the computed field, the computed field component 830 may be configured as or otherwise support a means for configuring the runtime service based on storing the first metadata input, the second metadata input, or both. In some examples, to support computing the value of the computed field, the computed field component 830 may be configured as or otherwise support a means for fetching, by the runtime service from the set of multiple data sources, the first metadata input, the second metadata input, or both. In some examples, to support computing the value of the computed field, the transformation component 840 may be configured as or otherwise support a means for applying the transformation to the federated API via the runtime service, where the value of the computed field is based on applying the transformation.

In some examples, the computed field component 830 may be configured as or otherwise support a means for computing, based on inputting one or more fields associated with the federated API, a set of multiple values corresponding to the one or more fields, the set of multiple values including the value of the computed field.

In some examples, to support computing the value of the computed field, the computed field component 830 may be configured as or otherwise support a means for configuring the runtime service based on storing the first metadata input, the second metadata input, or both. In some examples, to support computing the value of the computed field, the computed field component 830 may be configured as or otherwise support a means for fetching, by the runtime service from the one or more data sources, the first metadata input, the second metadata input, or both. In some examples, to support computing the value of the computed field, the transformation component 840 may be configured as or otherwise support a means for applying the transformation to the data source schema, the federated API, or both via the runtime service, where the value of the computed field is based on applying the transformation.

In some examples, the computed field component 830 may be configured as or otherwise support a means for determining, at a first time prior to generating the federated API, that the one or more data sources and the federated API include a first set of fields at the first time. In some examples, the computed field component 830 may be configured as or otherwise support a means for determining, at a second time after generating the federated API, that the one or more data sources and the federated API include a second set of fields at the second time, where the second set of fields include the computed field.

In some examples, the transformation combines a set of multiple fields from the first set of fields corresponding to the computed field based on the user input.

Figure 9:
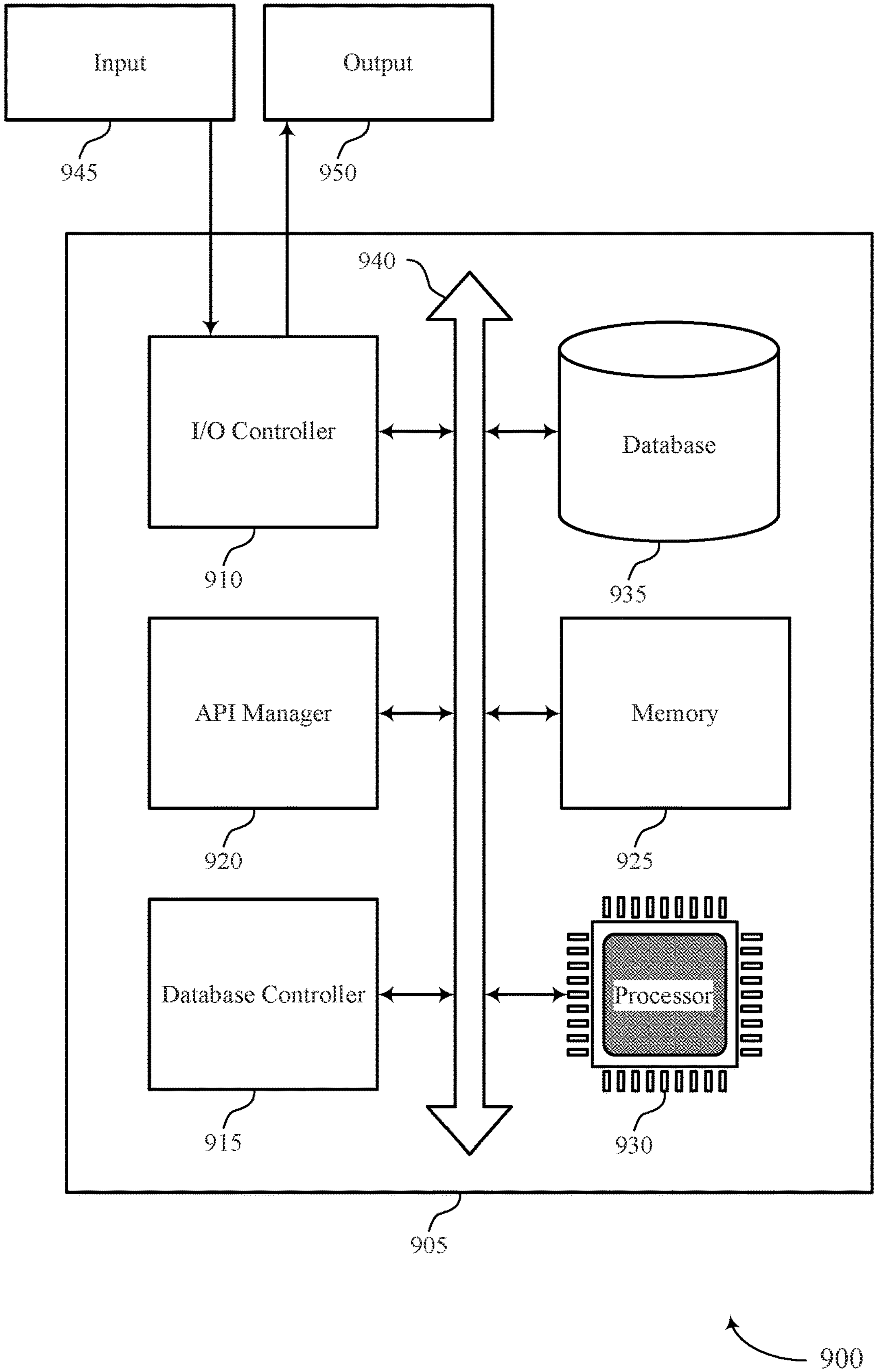
FIG. 9 shows a diagram of a system including a device that supports data transformations for data sources of a federated API in accordance with aspects of the present disclosure.

FIG. 9 shows a diagram of a system 900 including a device 905 that supports data transformations for data sources of a federated API in accordance with aspects of the present disclosure. The device 905 may be an example of or include the components of a device 705 as described herein. The device 905 may include components for bi-directional data communications including components for transmitting and receiving communications, such as a API manager 920, an I/O controller 910, a database controller 915, a memory 925, a processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting data transformations for data sources of a federated API).

The API manager 920 may support data processing in accordance with examples as disclosed herein. For example, the API manager 920 may be configured as or otherwise support a means for receiving, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field. The API manager 920 may be configured as or otherwise support a means for computing, by a runtime service of the federation management service, the value of the computed field using the second metadata input. The API manager 920 may be configured as or otherwise support a means for generating, using the federation management service, the federated API from the set of multiple data sources, where the federated API includes the computed field.

By including or configuring the API manager 920 in accordance with examples as described herein, the device 905 may support techniques for computing a new field from one or more data sources with greater efficiency and reduced manual interaction. For example, the device 905 may use metadata annotations and schema information to generate a federated API that includes the new field using transformation logic. As such, a client device (e.g., a client device 250 described with reference to FIG. 2) may use the transformation logic to obtain the new field in the federated API with reduced manual interaction.

Figure 10:
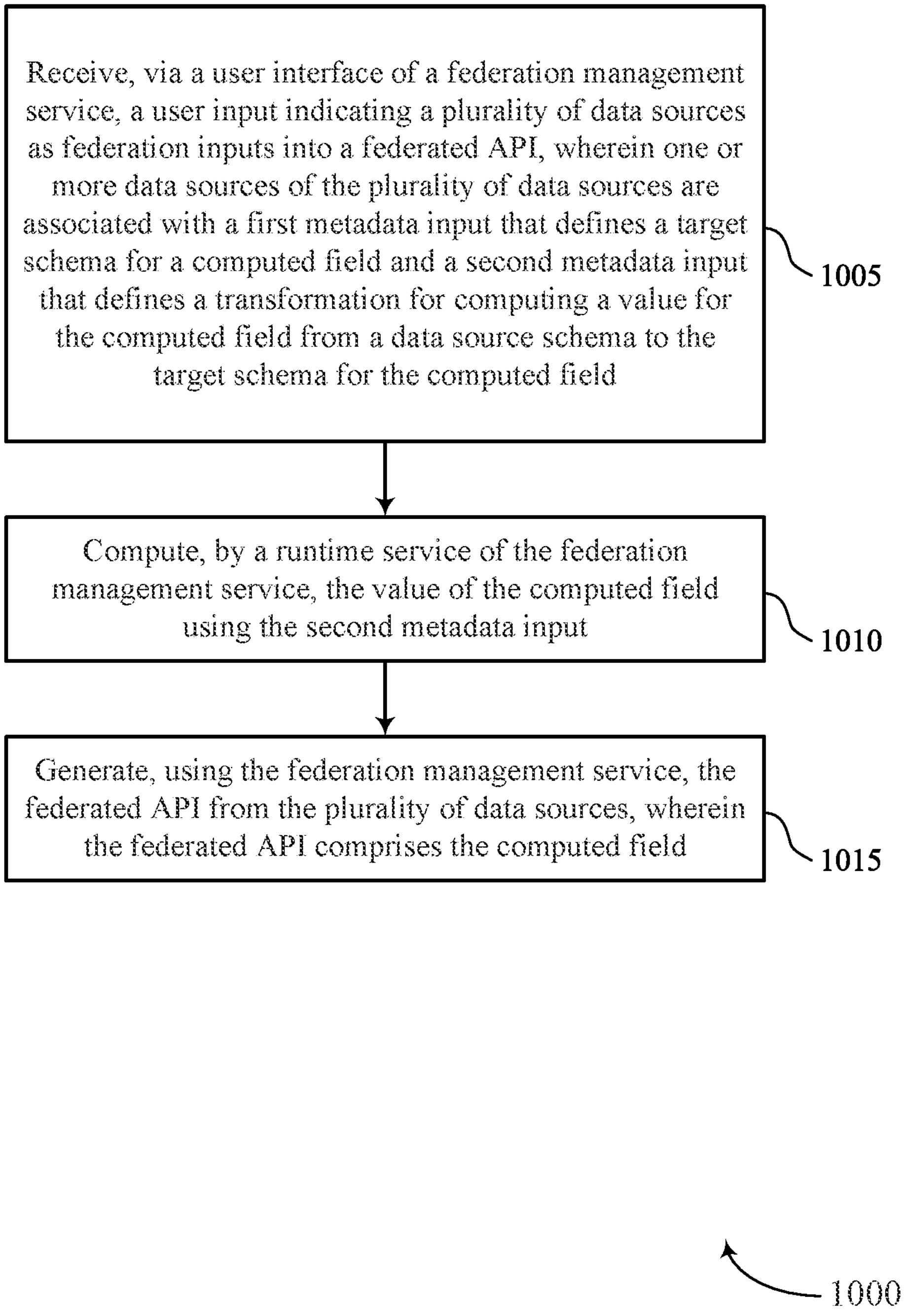
FIGS. 10 through 12 show flowcharts illustrating methods that support data transformations for data sources of a federated API in accordance with aspects of the present disclosure.

FIG. 10 shows a flowchart illustrating a method 1000 that supports data transformations for data sources of a federated API in accordance with aspects of the present disclosure. The operations of the method 1000 may be implemented by a server or its components as described herein. For example, the operations of the method 1000 may be performed by a server as described with reference to FIGS. 1 through 9. In some examples, a server may execute a set of instructions to control the functional elements of the server to perform the described functions. Additionally, or alternatively, the server may perform aspects of the described functions using special-purpose hardware.

At 1005, the method may include receiving, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field. The operations of 1005 may be performed in accordance with examples as disclosed herein. In some examples, aspects of the operations of 1005 may be performed by a data source component 825 as described with reference to FIG. 8.

At 1010, the method may include computing, by a runtime service of the federation management service, the value of the computed field using the second metadata input. The operations of 1010 may be performed in accordance with examples as disclosed herein. In some examples, aspects of the operations of 1010 may be performed by a computed field component 830 as described with reference to FIG. 8.

At 1015, the method may include generating, using the federation management service, the federated API from the set of multiple data sources, where the federated API includes the computed field. The operations of 1015 may be performed in accordance with examples as disclosed herein. In some examples, aspects of the operations of 1015 may be performed by a federated API generation component 835 as described with reference to FIG. 8.

Figure 11:
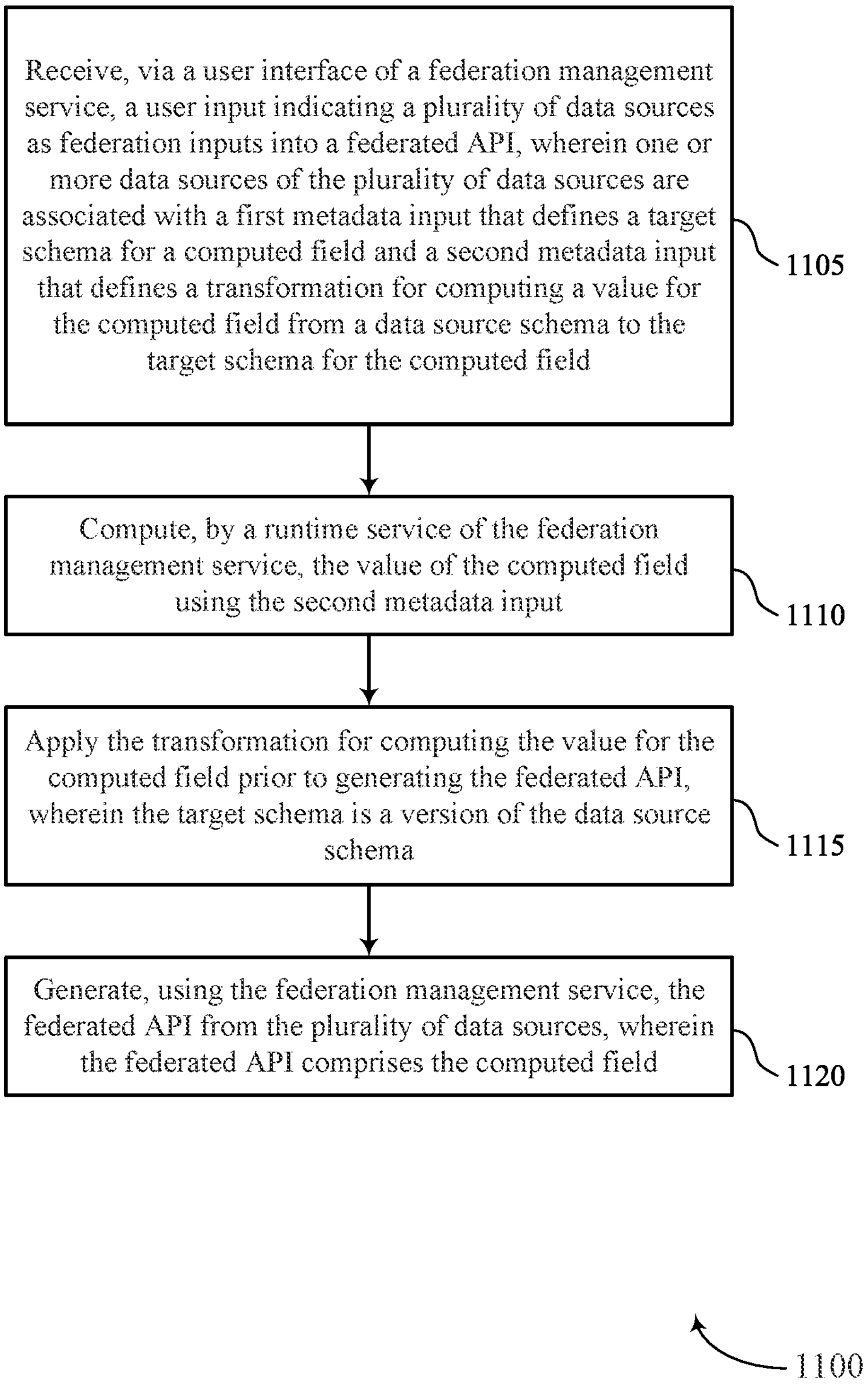

FIG. 11 shows a flowchart illustrating a method 1100 that supports data transformations for data sources of a federated API in accordance with aspects of the present disclosure. The operations of the method 1100 may be implemented by a server or its components as described herein. For example, the operations of the method 1100 may be performed by a server as described with reference to FIGS. 1 through 9. In some examples, a server may execute a set of instructions to control the functional elements of the server to perform the described functions. Additionally, or alternatively, the server may perform aspects of the described functions using special-purpose hardware.

At 1105, the method may include receiving, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field. The operations of 1105 may be performed in accordance with examples as disclosed herein. In some examples, aspects of the operations of 1105 may be performed by a data source component 825 as described with reference to FIG. 8.

At 1110, the method may include computing, by a runtime service of the federation management service, the value of the computed field using the second metadata input. The operations of 1110 may be performed in accordance with examples as disclosed herein. In some examples, aspects of the operations of 1110 may be performed by a computed field component 830 as described with reference to FIG. 8.

At 1115, the method may include applying the transformation for computing the value for the computed field prior to generating the federated API, where the target schema is a version of the data source schema. The operations of 1115 may be performed in accordance with examples as disclosed herein. In some examples, aspects of the operations of 1115 may be performed by a transformation component 840 as described with reference to FIG. 8.

At 1120, the method may include generating, using the federation management service, the federated API from the set of multiple data sources, where the federated API includes the computed field. The operations of 1120 may be performed in accordance with examples as disclosed herein. In some examples, aspects of the operations of 1120 may be performed by a federated API generation component 835 as described with reference to FIG. 8.

Figure 12:
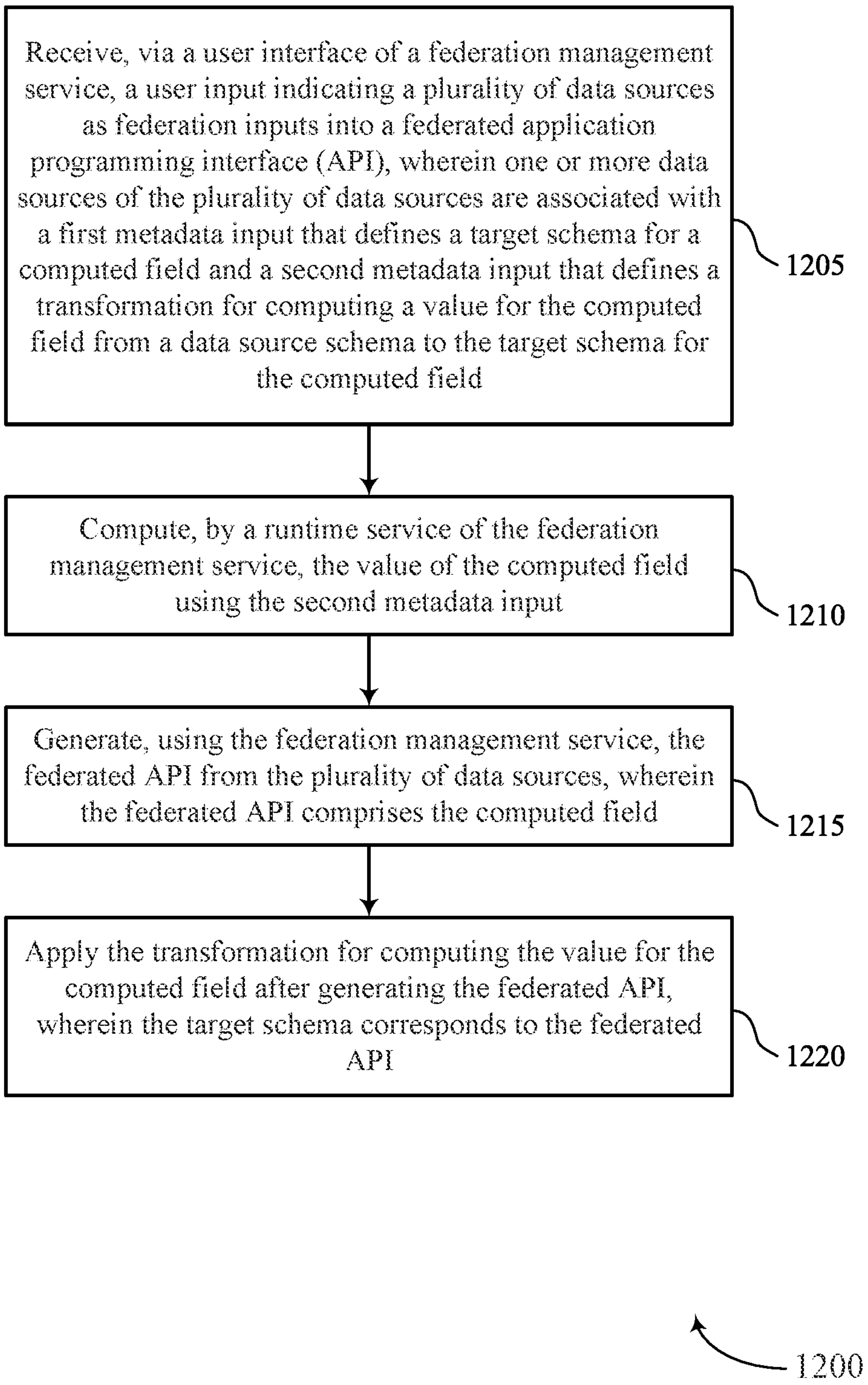

FIG. 12 shows a flowchart illustrating a method 1200 that supports data transformations for data sources of a federated API in accordance with aspects of the present disclosure. The operations of the method 1200 may be implemented by a server or its components as described herein. For example, the operations of the method 1200 may be performed by a server as described with reference to FIGS. 1 through 9. In some examples, a server may execute a set of instructions to control the functional elements of the server to perform the described functions. Additionally, or alternatively, the server may perform aspects of the described functions using special-purpose hardware.

At 1205, the method may include receiving, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field. The operations of 1205 may be performed in accordance with examples as disclosed herein. In some examples, aspects of the operations of 1205 may be performed by a data source component 825 as described with reference to FIG. 8.

At 1210, the method may include computing, by a runtime service of the federation management service, the value of the computed field using the second metadata input. The operations of 1210 may be performed in accordance with examples as disclosed herein. In some examples, aspects of the operations of 1210 may be performed by a computed field component 830 as described with reference to FIG. 8.

At 1215, the method may include generating, using the federation management service, the federated API from the set of multiple data sources, where the federated API includes the computed field. The operations of 1215 may be performed in accordance with examples as disclosed herein. In some examples, aspects of the operations of 1215 may be performed by a federated API generation component 835 as described with reference to FIG. 8.

At 1220, the method may include applying the transformation for computing the value for the computed field after generating the federated API, where the target schema corresponds to the federated API. The operations of 1220 may be performed in accordance with examples as disclosed herein. In some examples, aspects of the operations of 1220 may be performed by a transformation component 840 as described with reference to FIG. 8.

A method for data processing is described. The method may include receiving, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field, computing, by a runtime service of the federation management service, the value of the computed field using the second metadata input, and generating, using the federation management service, the federated API from the set of multiple data sources, where the federated API includes the computed field.

An apparatus for data processing is described. The apparatus may include a processor, memory coupled with the processor, and instructions stored in the memory. The instructions may be executable by the processor to cause the apparatus to receive, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field, compute, by a runtime service of the federation management service, the value of the computed field using the second metadata input, and generate, using the federation management service, the federated API from the set of multiple data sources, where the federated API includes the computed field.

Another apparatus for data processing is described. The apparatus may include means for receiving, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field, means for computing, by a runtime service of the federation management service, the value of the computed field using the second metadata input, and means for generating, using the federation management service, the federated API from the set of multiple data sources, where the federated API includes the computed field.

A non-transitory computer-readable medium storing code for data processing is described. The code may include instructions executable by a processor to receive, via a user interface of a federation management service, a user input indicating a set of multiple data sources as federation inputs into a federated API, where one or more data sources of the set of multiple data sources are associated with a first metadata input that defines a target schema for a computed field and a second metadata input that defines a transformation for computing a value for the computed field from a data source schema to the target schema for the computed field, compute, by a runtime service of the federation management service, the value of the computed field using the second metadata input, and generate, using the federation management service, the federated API from the set of multiple data sources, where the federated API includes the computed field.

Some examples of the method, apparatuses, and non-transitory computer-readable medium described herein may further include operations, features, means, or instructions for applying the transformation for computing the value for the computed field prior to generating the federated API, where the target schema may be a version of the data source schema.

In some examples of the method, apparatuses, and non-transitory computer-readable medium described herein, computing the value of the computed field may include operations, features, means, or instructions for configuring the runtime service based on storing the first metadata input, the second metadata input, or both, fetching, by the runtime service from the data source schema, the first metadata input, the second metadata input, or both, and applying the transformation to the data source schema via the runtime service, where the value of the computed field may be based on applying the transformation.

Some examples of the method, apparatuses, and non-transitory computer-readable medium described herein may further include operations, features, means, or instructions for generating the federated API based on unifying the version of the data source schema with the set of multiple data sources for the federated API.

Some examples of the method, apparatuses, and non-transitory computer-readable medium described herein may further include operations, features, means, or instructions for applying the transformation for computing the value for the computed field after generating the federated API, where the target schema corresponds to the federated API.

In some examples of the method, apparatuses, and non-transitory computer-readable medium described herein, computing the value of the computed field may include operations, features, means, or instructions for configuring the runtime service based on storing the first metadata input, the second metadata input, or both, fetching, by the runtime service from the set of multiple data sources, the first metadata input, the second metadata input, or both, and applying the transformation to the federated API via the runtime service, where the value of the computed field may be based on applying the transformation.

Some examples of the method, apparatuses, and non-transitory computer-readable medium described herein may further include operations, features, means, or instructions for computing, based on inputting one or more fields associated with the federated API, a set of multiple values corresponding to the one or more fields, the set of multiple values including the value of the computed field.

In some examples of the method, apparatuses, and non-transitory computer-readable medium described herein, computing the value of the computed field may include operations, features, means, or instructions for configuring the runtime service based on storing the first metadata input, the second metadata input, or both, fetching, by the runtime service from the one or more data sources, the first metadata input, the second metadata input, or both, and applying the transformation to the data source schema, the federated API, or both via the runtime service, where the value of the computed field may be based on applying the transformation.

Some examples of the method, apparatuses, and non-transitory computer-readable medium described herein may further include operations, features, means, or instructions for determining, at a first time prior to generating the federated API, that the one or more data sources and the federated API include a first set of fields at the first time and determining, at a second time after generating the federated API, that the one or more data sources and the federated API include a second set of fields at the second time, where the second set of fields include the computed field.

In some examples of the method, apparatuses, and non-transitory computer-readable medium described herein, the transformation combines a set of multiple fields from the first set of fields corresponding to the computed field based on the user input.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, via a user interface of a federation management service, a user input indicating a plurality of data sources as federation inputs into a federated application programming interface (API), one or more data sources of the plurality of data sources being associated with a first metadata input that defines a target schema for a computed field and a second metadata input that defines a transformation for computing a value for the computed field from a data source schema of the one or more data sources to the target schema for the computed field, wherein the computed field is based at least in part on one or more fields of at least two data sources of the plurality of data sources, and wherein each data source of the plurality of data sources corresponds to one of a plurality of different data source schemas;

computing, by a runtime service of the federation management service, the value of the computed field using the transformation defined by the second metadata input, wherein the transformation comprises transforming data from the data source schema to the target schema for the computed field, wherein the runtime service generates the computed field by combining the one or more fields from the at least two data sources according to the target schema without modifying the data source schema of the at least two data sources, and wherein the at least two data sources corresponds to two or more different data source schemas of the plurality of different data source schemas; and generating, using the federation management service, the federated API from the plurality of data sources, wherein the federated API comprises the computed field.

2. The method of claim 1, further comprising:

applying the transformation for computing the value for the computed field prior to generating the federated API, wherein the target schema is a version of the data source schema of the at least two data sources.

3. The method of claim 2, wherein computing the value of the computed field comprises:

configuring the runtime service based at least in part on storing the first metadata input, the second metadata input, or both;

fetching, by the runtime service from the data source schema, the first metadata input, the second metadata input, or both; and applying, via the runtime service, the transformation to the data source schema of the at least two data sources, wherein the value of the computed field is based at least in part on applying the transformation.

4. The method of claim 2, further comprising:

generating the federated API based at least in part on unifying the version of the data source schema with the plurality of data sources for the federated API.

5. The method of claim 1, further comprising:

applying the transformation for computing the value for the computed field after generating the federated API, wherein the target schema corresponds to the federated API.

6. The method of claim 5, wherein computing the value of the computed field comprises:

configuring the runtime service based at least in part on storing the first metadata input, the second metadata input, or both;

fetching, by the runtime service from the plurality of data sources, the first metadata input, the second metadata input, or both; and applying the transformation to the federated API via the runtime service, wherein the value of the computed field is based at least in part on applying the transformation.

7. The method of claim 5, further comprising:

computing, based at least in part on inputting one or more fields associated with the federated API, a plurality of values corresponding to the one or more fields, the plurality of values comprising the value of the computed field.

8. The method of claim 1, wherein computing the value of the computed field comprises:

configuring the runtime service based at least in part on storing the first metadata input, the second metadata input, or both;

fetching, by the runtime service from the one or more data sources, the first metadata input, the second metadata input, or both; and applying the transformation to the data source schema of the at least two data sources, the federated API, or both via the runtime service, wherein the value of the computed field is based at least in part on applying the transformation.

9. The method of claim 1, further comprising:

determining, at a first time prior to generating the federated API, that the one or more data sources and the federated API comprise a first set of fields at the first time; and determining, at a second time after generating the federated API, that the one or more data sources and the federated API comprise a second set of fields at the second time, wherein the second set of fields comprises the computed field.

10. The method of claim 9, wherein the transformation combines a plurality of fields from the first set of fields corresponding to the computed field based at least in part on the user input.

11. An apparatus for data processing, comprising:

at least one processor;

at least one memory coupled with the at least one processor; and instructions stored in the at least one memory and executable by the at least one processor to cause the apparatus to:

receive, via a user interface of a federation management service, a user input indicating a plurality of data sources as federation inputs into a federated application programming interface (API), one or more data sources of the plurality of data sources being associated with a first metadata input that defines a target schema for a computed field and a second metadata input that defines a transformation for computing a value for the computed field from a data source schema of the one or more data sources to the target schema for the computed field, wherein the computed field is based at least in part on one or more fields of at least two data sources of the plurality of data sources, and wherein each data source of the plurality of data sources corresponds to one of a plurality of different data source schemas;

compute, by a runtime service of the federation management service, the value of the computed field using the transformation defined by the second metadata input, wherein the transformation comprises transforming data from the data source schema to the target schema for the computed field, wherein the runtime service generates the computed field by combining the one or more fields from the at least two data sources according to the target schema without modifying the data source schema of the at least two data sources, and wherein the at least two data sources corresponds to two or more different data source schemas of the plurality of different data source schemas; and generate, using the federation management service, the federated API from the plurality of data sources, wherein the federated API comprises the computed field.

12. The apparatus of claim 11, wherein the instructions are further executable by the at least one processor to cause the apparatus to:
apply the transformation for computing the value for the computed field prior to generating the federated API, wherein the target schema is a version of the data source schema of the at least two data sources.

13. The apparatus of claim 12, wherein the instructions to compute the value of the computed field are executable by the at least one processor to cause the apparatus to:
configure the runtime service based at least in part on storing the first metadata input, the second metadata input, or both;
fetch, by the runtime service from the data source schema, the first metadata input, the second metadata input, or both; and
apply, via the runtime service, the transformation to the data source schema of the at least two data sources, wherein the value of the computed field is based at least in part on applying the transformation.

14. The apparatus of claim 12, wherein the instructions are further executable by the at least one processor to cause the apparatus to:
generate the federated API based at least in part on unifying the version of the data source schema with the plurality of data sources for the federated API.

15. The apparatus of claim 11, wherein the instructions are further executable by the at least one processor to cause the apparatus to:
apply the transformation for computing the value for the computed field after generating the federated API, wherein the target schema corresponds to the federated API.

16. The apparatus of claim 15, wherein the instructions to compute the value of the computed field are executable by the at least one processor to cause the apparatus to:
configure the runtime service based at least in part on storing the first metadata input, the second metadata input, or both;
fetch, by the runtime service from the plurality of data sources, the first metadata input, the second metadata input, or both; and
apply the transformation to the federated API via the runtime service, wherein the value of the computed field is based at least in part on applying the transformation.

17. The apparatus of claim 15, wherein the instructions are further executable by the at least one processor to cause the apparatus to:
compute, based at least in part on inputting one or more fields associated with the federated API, a plurality of values corresponding to the one or more fields, the plurality of values comprising the value of the computed field.

18. The apparatus of claim 11, wherein the instructions to compute the value of the computed field are executable by the at least one processor to cause the apparatus to:
configure the runtime service based at least in part on storing the first metadata input, the second metadata input, or both;
fetch, by the runtime service from the one or more data sources, the first metadata input, the second metadata input, or both; and
apply the transformation to the data source schema of the at least two data sources, the federated API, or both via the runtime service, wherein the value of the computed field is based at least in part on applying the transformation.

19. The apparatus of claim 11, wherein the instructions are further executable by the at least one processor to cause the apparatus to:
determine, at a first time prior to generating the federated API, that the one or more data sources and the federated API comprise a first set of fields at the first time; and
determine, at a second time after generating the federated API, that the one or more data sources and the federated API comprise a second set of fields at the second time, wherein the second set of fields comprises the computed field.

20. A non-transitory computer-readable medium storing code for data processing, the code comprising instructions executable by at least one processor to:
receive, via a user interface of a federation management service, a user input indicating a plurality of data sources as federation inputs into a federated application programming interface (API), one or more data sources of the plurality of data sources being associated with a first metadata input that defines a target schema for a computed field and a second metadata input that defines a transformation for computing a value for the computed field from a data source schema of the one or more data sources to the target schema for the computed field, wherein the computed field is based at least in part on one or more fields of at least two data sources of the plurality of data sources, and wherein each data source of the plurality of data sources corresponds to one of a plurality of different data source schemas;
compute, by a runtime service of the federation management service, the value of the computed field using the transformation defined by the second metadata input, wherein the transformation comprises transforming data from the data source schema to the target schema for the computed field, wherein the runtime service generates the computed field by combining the one or more fields from the at least two data sources according to the target schema without modifying the data source schema of the at least two data sources, and wherein the at least two data sources corresponds to two or more different data source schemas of the plurality of different data source schemas; and
generate, using the federation management service, the federated API from the plurality of data sources, wherein the federated API comprises the computed field.

* * * * *